United States Patent [19]

Morris

[11] 4,032,242

[45] June 28, 1977

[54] CORNER JOINT BRACE CHARACTERIZED BY A FLEXIBLE CONSTRUCTION

[76] Inventor: Max O. Morris, 582 E. Sunset Highway, Issaquah, Wash. 98027

[22] Filed: Mar. 14, 1975

[21] Appl. No.: 558,281

[52] U.S. Cl. .............................. 403/231; 403/403; 403/169; 248/188

[51] Int. Cl.² ......................................... F16B 12/46

[58] Field of Search .......... 403/219, 171, 172, 231, 403/403, 382, 217, 205, 176; 108/156; 248/188, 222; 52/753 D; 217/69

[56] References Cited

UNITED STATES PATENTS

| | | | |
|---|---|---|---|
| 231,880 | 8/1880 | Winchell | 108/156 |
| 261,103 | 7/1882 | Rose | 52/753 D |
| 475,980 | 5/1892 | Holt | 108/156 |
| 875,755 | 1/1908 | Wanner | 403/231 |
| 915,002 | 3/1909 | Werner | 108/156 |
| 939,005 | 11/1909 | Goedeke | 217/69 |
| 2,148,353 | 2/1939 | Hoffmann | 403/231 |
| 2,828,044 | 3/1958 | Reiss et al. | 248/222 X |
| 3,400,847 | 9/1968 | Stute | 52/753 D |

FOREIGN PATENTS OR APPLICATIONS 73,685  8/1917  Austria ................. 217/69

OTHER PUBLICATIONS

Corner Block Co. 9/13/74 4 pp. dwg., 1 p. printed matter.

Primary Examiner—Andrew V. Kundrat
Attorney, Agent, or Firm—Bell, Seltzer, Park & Gibson

[57] ABSTRACT

A corner joint brace for furniture members and the like having a body including a pair of rearwardly extending, oppositely inclined, angularly related, side portions having front surfaces for being positioned adjacent inside surfaces of angularly related, corner joint members. The corner joint brace is characterized by at least a partial flexible construction of the side portions for use in bracing a variety of angled corner joint members of the same or different angular relations, while providing the desired structural strength to the brace for the bracing function thereof.

3 Claims, 6 Drawing Figures

U.S. Patent  June 28, 1977  4,032,242
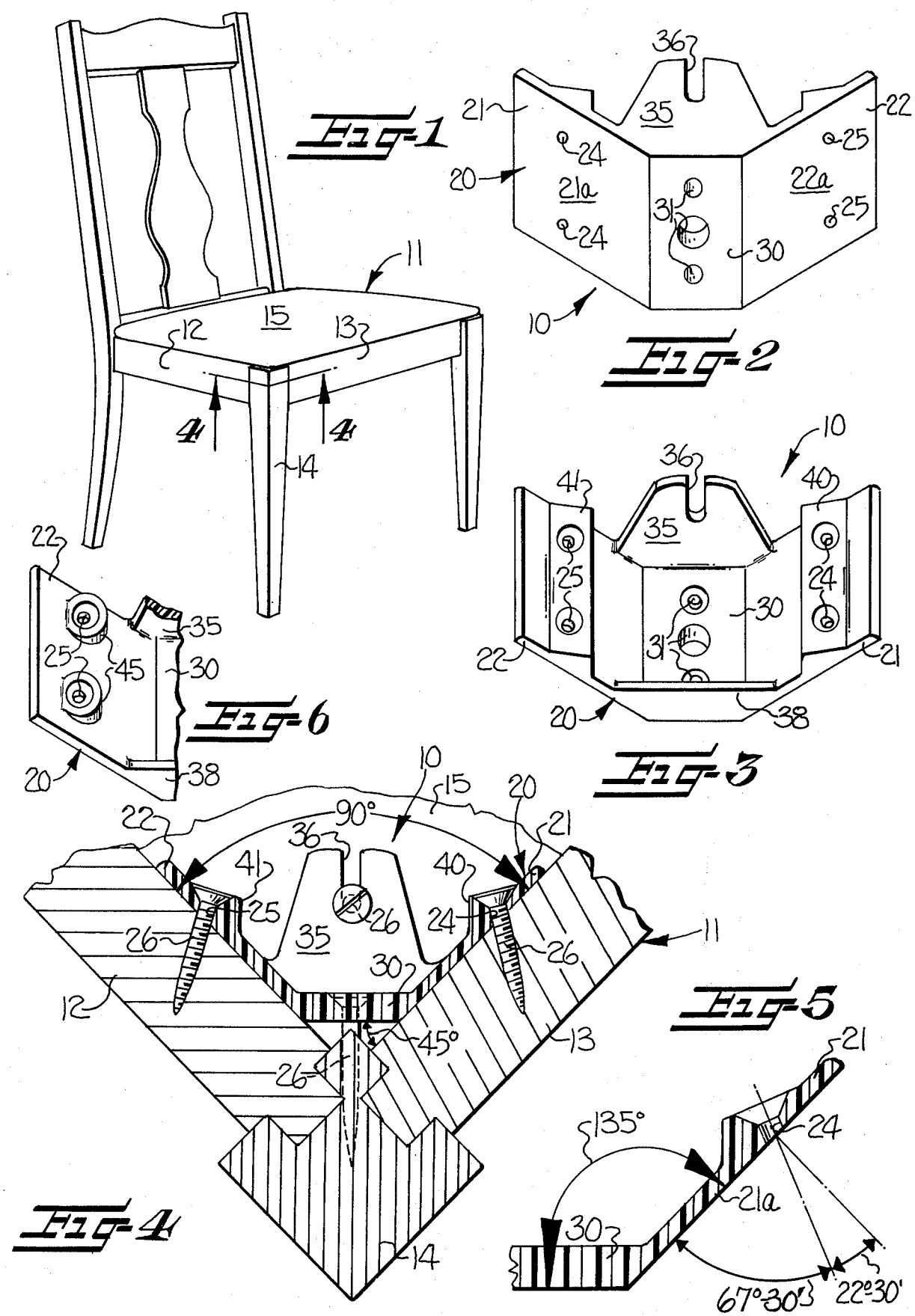

4,032,242

CORNER JOINT BRACE CHARACTERIZED BY A FLEXIBLE CONSTRUCTION

This invention relates to an improved corner joint brace for furniture members and the like.

BACKGROUND OF THE INVENTION

Corner joint braces are commonly used for bracing members forming corners of various articles of manufacture, such as furniture items including tables, chairs and the like, for purposes of strengthening the corner joint and providing a brace between the members forming the corner joint.

In the past, wooden corner blocks have commonly been used in the furniture industry for being secured to the corner joint members for bracing of the corner joint. However, these wooden corner blocks are easily breakable and various sizes were required for various size corner joint constructions. Also, various other materials, including metal, etc., have been used for making corner joint braces. However, these non-wooden corner joint braces have been complex in design and not suited for inexpensive mass production. Additionally, fastener receiving apertures for previously proposed corner joint braces positioned screw fasteners or nail fasteners at approximately 90° or perpendicular to the angularly related corner joint members. Thus, problems in separation of the corner joint members were presented, when the article of furniture, etc. was subjected to forces on the corner joint members in directions away from the corner joint through bending of the fasteners in the direction of these forces.

Examples of previously proposed corner blocks or corner joint braces may be seen in the disclosures of the following patents considered during the preparation hereof:

U.S. Pat. No. 821,338
U.S. Pat. No. 1,551,714
U.S. Pat. No. 3,370,871
U.S. Pat. No. 3,400,847
U.S. Pat. No. 3,658,382
U.S. Pat. No. 3,818,672
U.S. Pat. No. 3,846,002
Swiss Pat. No. 371,570

OBJECTS AND SUMMARY OF THE INVENTION

Accordingly, it is the object of this invention to provide an improved construction of a corner joint brace which is characterized by provisions for bracing the corner joint members in such a manner as to deter separation of the members of the braced corner joint.

It is a further object of this invention to provide such an improved construction of a corner joint brace which provides versatility in use with various angularly related, corner joints and which may be easily and inexpensively mass produced.

By this invention, it has been found that the above objects may be accomplished by providing a corner joint brace for furniture members and the like comprising broadly the following.

A body is provided including a pair of rearwardly extending, oppositely inclined, angularly related, side portions having front faces for being positioned adjacent inside surfaces of angularly related, corner joint members. At least one aperture extends transversely through each of the side portions for receiving fasteners therethrough for securing the brace to the corner joint members. The apertures each are disposed along a longitudinal axis extending forwardly and obliquely with respect to the front faces of the side portions for positioning the fasteners to extend forwardly and obliquely into the corner joint members toward the corner joint to deter separation of the members of the braced corner joint.

Preferably, each of the side portions are formed of flexible resilient material for flexing forwardly or rearwardly, if necessary, to be positioned contiguous with the inside surfaces of the corner joint members when the corner joint brace is secured thereto by the fasteners. The corner joint brace is preferably formed of an integral, one-piece, molded, flexible, resilient plastic material for providing the above flexibility of the side portions and for enabling inexpensive mass production of the corner joint braces.

Other details and features of the specific preferred construction of the corner joint brace of this invention will be set forth in the detailed description to follow.

BRIEF DESCRIPTION OF THE DRAWINGS

Some of the objects and advantages of this invention having been set forth, other objects and advantages will appear, when taken in conjunction with the accompanying drawings, in which:

FIG. 1 is a perspective view of an article of furniture having corner joints which are braced by the corner joint brace of this invention;

FIG. 2 is a perspective view, taken from the front, of the corner joint brace of this invention;

FIG. 3 is a perspective view, taken from the rear, of the corner joint brace of this invention;

FIG. 4 is an enlarged, sectional view, taken generally along the line 4—4 of FIG. 1, showing the corner joint brace of this invention secured to a corner joint of the article of furniture of FIG. 1;

FIG. 5 is a cross sectional detail of a portion of the corner joint brace of this invention; and FIG. 6 is a partial detail of one of the side portions of the corner joint brace of this invention and showing an alternate construction of a portion thereof.

DETAILED DESCRIPTION OF PREFERRED EMBODIMENT

Referring now to the drawings, the corner joint brace, generally indicated by the reference numeral 10, is illustrated therein as being utilized for bracing a corner joint of an article of furniture 11, in the form of a chair, having angularly related, side frame members 12, 13, a leg 14 and a top seat 15, all of which merge into a corner joint as shown in FIGS. 1 and 4. The members 12, 13, 14 and 15 all form corner joint members for the article of furniture 11.

While the corner joint brace 10 of this invention is illustrated in the drawings and will be described specifically hereinafter as secured to corner joint members 12, 13, 14 and 15 of the corner joint of a chair 11, it is to be understood that the corner joint brace 10 of this invention could be utilized with various members forming a corner joint for any article of manufacture, including other furniture items, etc., and which may or may not utilize corner joint members such as a leg 14 and a top member or seat 15, but may only include angularly related corner joint members, such as side frame members 12 and 13.

The corner joint brace 10 comprises a body 20 including a pair of rearwardly extending, oppositely inclined, angularly related, side portions 21, 22 having front surfaces 21a, 22a, respectively, for being positioned adjacent inside surfaces of the angularly related, corner joint members 12, 13 respectively.

Each of the side portions 21, 22 has at least one transversely extending aperture 24, 25 extending therethrough for receiving fasteners 26 through the apertures 24, 25 for securing the brace 10 to the corner joint members 12, 13, as shown in FIG. 4. The apertures 24, 25 are each disposed along a longitudinal axis extending forwardly and obliquely with respect to the front faces 21a, 22a of the side portions 21, 22 for positioning the fastener 26 to extend forwardly and obliquely into the corner joint members 12, 13 toward the corner joint (see FIG. 4) to deter separation of the members 12, 13 of the braced corner joint by applying forces along the corner joint members 12, 13 forwardly in the direction of the corner joint and for resisting bending of the fasteners 26 when forces on the corner joint members 12, 13 from normal use of the article of furniture 11 are in a direction away from the corner joint. If the fasteners 26 were disposed at generally right angles or 90° with respect to the corner joint members 12, 13, as was the common disposition in prior art corner joint braces, forces on the corner joint members 12, 13 in a direction away from the corner joint would more readily cause bending of the fasteners 26 and separation of the corner joint members 12, 13. The fasteners 26 are illustrated in the drawings as being in the form of screw type fasteners; however, it is to be understood that other type fasteners, such as nails, etc. could be used with the corner joint brace 10 of this invention.

The body 20 of the corner joint brace 10 further includes a front portion 30 for being positioned adjacent the inside of the corner of the corner joint members, as shown in FIG. 4. At least one aperture 31 extends transversely through the front portion 30 for receiving a fastener 26 therethrough, if desired, for securing the brace to generally the corner of the corner joint members. In the corner joint illustrated in the drawings of the article of furniture 11, a fastener 26 may be positioned in one or all of the apertures 31 in the front portion 30 of the corner joint brace 10 and secured into the corner joint member or leg 14 of the corner joint. However, if such corner joint member 14 is not included in a particular corner joint construction, a fastener 26 through the apertures 31 may not be desired.

The body 20 of the corner joint brace 10 may further include a rearwardly extending, top flange member 35 which is secured to a top edge of the front portion 30 and forward portions of top edges of the side portions 21, 22, as shown in FIGS. 2 and 3. This top flange member 35 has an aperture or open sided slot 36 extending therethrough for receiving a fastener 26 through the aperture 36 for securing the brace 10 to a top or seat member 15 of the article of furniture 11, if desired, as shown in FIG. 4. However, if such member 15 is not present, no fastener 26 through the aperture 36 would be utilized.

The body 20 also preferably includes a reinforcing rib member 38 secured to a bottom edge of the portion 30 and forward portions of bottom edges of the side portions 21, 22, as shown in FIG. 3.

In a preferred construction, the side portions 21, 22 each include an elongate protrusion 40, 41 on the inside face thereof generally medially thereof extending from the top edge to the bottom edge and which may be of generally triangular cross-sectional shape. The apertures 24, 25 through the side portions 21, 22 are formed through the protrusions 40, 41 for providing additional longitudinal dimensions to the apertures 24, 25. Also, the apertures are generally funnel shaped, as shown in FIGS. 3, 4 and 5 for receiving screw fasteners therethrough having similarly shaped heads and bodies so that the screw fasteners may be stabilized in the funnel shaped apertures and the heads of the screw fasteners contained within the apertures to prevent sharp edges.

Alternatively, as shown in FIG. 6, the protrusions 40, 41 may be replaced by raised bosses 45 on the inside faces of the side portions 21, 22 of the body 20 of the brace 10 so that each of the apertures 24, 25 may extend therethrough for providing the additional longitudinal dimensions to the apertures and allowing the apertures to be generally funnel shaped for the purpose described above.

Preferably, the corner joint brace 10 of this invention, including the component described above, is formed of an integral, one-piece, molded, flexible, resilient, plastic construction, which may be a high impact, flexible, resilient styrene, for inexpensive mass production thereof. Also, the side portions 21, 22 are desirably flexible, by use of the above material or otherwise, for forward or rearward flexing, if necessary, to be positioned contiguous with the inside surfaces of the corner joint members 12, 13 in the event the angular relation of these corner joint members 12, 13 is slightly different from the angular relation of the front faces 21a, 22a of the side portions 21, 22 of the corner joint brace 10.

The desired specific angular relations of the above described components of the corner joint brace 10 for a preferred commercial embodiment, are illustrated specifically in FIGS. 4 and 5. As may be seen therein, the front faces 21a, 22a of the side portions 21, 22 are preferably disposed at an included angle of 90° with respect to each other and each are disposed at an included angle of 135° with respect to the front face of the front portion 30. This angular relation allows the front faces 21a, 22a to be placed contiguous with the inside surfaces of 90° angular related corner joint members 12, 13, which is the normal angular relation of such members. However, as discussed above, the side portions 21, 22 are preferably flexible so as to flex forwardly or rearwardly to be placed contiguous with other than 90° angular related corner joint members 12, 13.

The front face of the front portion 30 of the brace 10 would be disposed at approximately a 45° angle with respect to the inside surfaces of the corner joint members 12, 13 when these members are at a 90° included angle with respect to each other, so that a fastener 26 through an aperture 31 in the front portion 30 would extend approximately into the corner of the corner joint members.

The longitudinal axis of each of the apertures 24, 25 in the side portions 21, 22 is preferably disposed at an included angle of approximately 22½° with respect to a perpendicular axis extending forwardly of the front surfaces 21a, 22a (see FIG. 5) for positioning the fasteners 26 at an acute angle of approximately 67½° with respect to the inside surfaces of the corner joint members 12, 13.

Thus, it may be seen, that the improved corner joint brace of this invention has provided a construction which is characterized by provisions therein for bracing the corner joint members in such a manner as to deter separation of the members of the braced corner joint. Also, such improved construction provides versatility in use with various angularly related corner joints and various arrangements of corner joint members forming same and can be easily and inexpensively mass produced for use in bracing corner joint constructions of many articles of manufacture including furniture items and the like.

In the drawings and specification there has been set forth a preferred embodiment of the invention, and although specific terms are employed, they are used in a generic and descriptive sense only and not for purposes of limitation.

What is claimed is:

1. A corner joint brace for furniture corner joint members and the like and characterized by a flexible construction for use in bracing a variety of angled corner joint members while providing the desired structural strength for the bracing function, said brace comprising an integral, one-piece flexible and resilient molded plastic body construction including:
   a pair of rearwardly and longitudinally extending, oppositely inclined, angularly related, side portions having front and rear surfaces and top and bottom edges for being positioned with said front surfaces adjacent inside surfaces of the angularly related corner joint members to be braced, said side portions comprising flexible, resilient material;
   at least one aperture extending through each of said side portions at a longitudinally extending rearward area only thereof from said rear surface to said front surface thereof for receiving fasteners therethrough for securing said brace to the corner joint members; and
   reinforcing top and bottom portions extending respectively between said top edges and between said bottom edges of a longitudinally extending forward area only at the apex of said side portions and forwardly of said apertures for providing structural strength and stability to said brace for the bracing function thereof while allowing retention of the resilience and flexibility of the longitudinally extending rearward area of each of said side portions containing said apertures from said top edges to said bottom edges;
   whereby, said brace may be positioned inside the corner joint of furniture and the like having corner joint members of the same or different angular relation for flexing forwardly or rearwardly, if necessary, of the longitudinally extending rearward areas of said side portions containing said fastener apertures for the positioning thereof contiguous with the inside surfaces of the corner joint members when fastened thereto for bracing thereof.

2. A corner joint brace for furniture corner joint members and the like and characterized by a flexible construction for use in bracing a variety of angled corner joint members while providing the desired structural strength for the bracing function, said brace comprising an integral, one-piece, flexible and resilient molded plastic body construction including:
   a pair of rearwardly and longitudinally extending, oppositely inclined, approximately 90° included angularly related, side portions having front and rear surfaces and top and bottom edges for being positioned with said front surfaces adjacent inside surfaces of the angularly related, corner joint members to be braced;
   at least one aperture extending through each of said side portions at a longitudinally extending rearward area only thereof from said rear surface to said front surface thereof along a longitudinal axis extending forwardly and obliquely with respect to said front surface for receiving fasteners therethrough extending forwardly and obliquely into the corner joint members toward the corner joint for securing said brace to the corner joint and for deterring separation of the members of the braced corner joint and for aiding in flexing of said side portions; and
   reinforcing top and bottom portions extending respectively between said top edges and between said bottom edges of a longitudinally extending forward area only at the apex of said side portions and forwardly of said apertures for providing structural strength and stability to said brace for the bracing function thereof while allowing retention of the resilience and flexibility of the longitudinally extending rearward area of each of said side portions containing said apertures from said top edges to said bottom edges;
   whereby, said brace may be positioned inside a corner joint of furniture and the like having corner joint members of the same or different angular relation for flexing of the longitudinal extending rearward areas of said side portions containing said fastener apertures forwardly or rearwardly, if necessary, to be positioned contiguous with the inside surfaces of the corner joint members when fastened thereto for bracing thereof.

3. A corner joint brace for furniture corner joint members and the like and characterized by a flexible construction for use in bracing a variety of angled corner joint members while providing the desired structural strength of the bracing function, said brace comprising an integral, one-piece, flexible and resilient molded plastic body construction including:
   a front portion for being positioned adjacent the inside of the corner of the corner joint members and having side edges and top and bottom edges;
   at least one transversely extending aperture through said front portion for receiving a fastener therethrough, if desired, for securing said brace to generally the corner of the corner joint members;
   a pair of side portions respectively integrally attached to said side edges of said front portion and extending rearwardly and longitudinally therefrom and being oppositely inclined and approximately 90° included angularly related with respect to each other and approximately 135° included angularly related with respect to said front portion and having front and rear surfaces and top and bottom edges for being positioned with said front surfaces adjacent inside surfaces of angularly related corner joint members to be braced;
   at least one aperture extending through each of said side portions at a longitudinally extending rearward area thereof from said rear surface to said front surface thereof along a longitudinal axis extending forwardly and obliquely with respect to said front surface for receiving fasteners therethrough extending forwardly and obliquely into the corner joint members toward the corner joint for securing said brace to the corner joint and for deterring separation of the members of the braced corner joint and for aiding in flexing of said side portions, each of said apertures through said side portions includes an inwardly extending protrusion on said inside faces of said side portions for reinforcing said apertures and for stabilizing the fasteners when secured in said side portions;

reinforcing means comprising a top flange member integrally secured to and extending between said top edges of a longitudinally extending forward area only of said side portions and a reinforcing rib member integrally secured to and extending between said bottom edges of the longitudinally extending forward area only of said side portions, for providing structural strength and stability to said brace for the bracing function thereof while retaining the resilience and flexibility of the longitudinally extending rearward area of said side portions from said top edges to said bottom edges; and at least one aperture extending transversely through said top flange portion for receiving a fastener therethrough, if desired, for securing said brace to a top member of the corner joint;

whereby, said brace may be positioned inside the corner joint of furniture and the like having corner joint members of the same or different angular relations for flexing of the longitudinally extending rearward areas of said side portions containing said fastener apertures forwardly or rearwardly, if necessary, to be positioned contiguous with the inside surfaces of the corner joint members when fastened thereto for bracing thereof.

* * * * *